Reissued Nov. 24, 1931 Re. 18,256

UNITED STATES PATENT OFFICE

WALTER E. LILIENFIELD, OF HIGHLAND PARK, ILLINOIS, ASSIGNOR TO LILIENFIELD BROS. & COMPANY, OF CHICAGO, ILLINOIS

METHOD OF CURING TOBACCO

No Drawing. Original No. 1,731,018, dated October 8, 1929, Serial No. 176,303, filed March 17, 1927. Application for reissue filed November 1, 1930. Serial No. 492,862.

The invention relates to a method of curing tobacco.

In the manufacture of tobacco for smoking, it is necessary before blending and mixing to cure the strong and harsh raw material so as to modify its disagreeable taste and make it mild. It is now common practice to effect curing by ageing the tobacco or artificially obtaining the same result by means of a renewed fermentation induced by moisture and heat, or by mascerating the leaves in water acidulated with hydrochloric acid or some other chemical, and washing them out with pure water. These curing methods are objectionable because they require a great deal of labor and time and are not as effective as desired in rendering the strong tobacco mild.

The object of the present invention is to provide a new and improved method of curing strong and harsh tobacco preparatory to mixing and blending, which requires less time and labor than former methods and effectively renders the strong tobacco mild and fine so that it has an aromatic and pleasant flavor.

The improved method of curing is applied to the tobacco after it has been aged and fermented and consists in loosening and piling the tobacco leaves and then subjecting them to an ultra-violet ray. The latter may be produced by any suitable apparatus which is positioned above the pile a sufficient distance so that the leaves are not affected by the heat generated by the ray. The ray is applied from fifteen minutes to two hours depending upon the quality and thickness of the tobacco under treatment and the mildness desired.

In practice, this method of curing has been found to eliminate the necessity of ageing the tobacco for a long time or the labor involved in curing it by other methods. It has also been found to be the only method whereby any desired mildness may be obtained.

Having thus described the invention, what I claim as new and desire to secure by Letters Patent, is:

1. That improvement in rendering mild and curing strong tobacco which consists in loosening previously aged and fermented tobacco leaves and then subjecting them to a machine created ultra-violet ray for a period ranging approximately from fifteen minutes to two hours to render them of the desired mildness.

2. That improvement in the treatment of tobacco which consists in irradiating tobacco with machine created ultra-violet ray for a period ranging approximately from fifteen minutes to two hours.

3. That improvement in rendering tobacco mild which consists in arranging previously aged and fermented tobacco in close proximity to a machine designed to produce ultra-violet ray and exposing the tobacco to the ultra-violet ray produced by the machine.

4. That improvement in the treatment of tobacco which consists in arranging previously aged and fermented tobacco in a loosened state beneath a machine designed to produce ultra-violet ray and exposing the tobacco to the ultra-violet ray produced by the machine to render it mild and less harsh.

5. That improvement in the curing of tobacco which consists in arranging tobacco in close proximity to a machine designed to produce ultra-violet ray and exposing the tobacco to the ultra-violet ray produced by the machine for a period not exceeding two hours in order to render it mild and less harsh.

6. That improvement in the treatment of tobacco which consists in loosely arranging previously aged and fermented tobacco beneath a machine designed to produce ultra-violet ray and exposing the tobacco to the ultra-violet ray produced by the machine for a period not exceeding two hours in order to render it mild and less harsh.

7. That improvement in the treatment of tobacco, before mixing and blending, which consists in loosely arranging harsh and strong previously aged and fermented tobacco leaves beneath a machine designed to produce ultra-violet ray and exposing the tobacco leaves to the ultra-violet ray produced by the machine in order to render them mild and less harsh.

8. That improvement in treating tobacco which consists in loosely arranging previously aged and fermented tobacco beneath a machine designed to produce ultra-violet ray and at a sufficient distance from the machine to prevent the heat generated by the machine during operation thereof, from affecting the tobacco, and irradiating the tobacco with the ultra-violet ray produced by the machine to render it mild and less harsh.

9. That improvement in treating tobacco which consists in loosely arranging previously aged and fermented tobacco in close proximity to a machine designed expressly to produce ultra-violet ray, and irradiating the tobacco with the machine-produced ultra-violet ray and in the absence of extraneous heat in order to render the tobacco mild and less harsh.

10. That improvement in the treatment of tobacco before mixing and blending, which consists in loosely arranging harsh and strong, previously aged and fermented tobacco leaves beneath a machine designed expressly to produce ultra-violet ray and at a sufficient distance from the machine to prevent the heat generated by the machine from affecting the tobacco, and exposing the tobacco leaves to the ultra-violet ray produced by the machine for a period not exceeding two hours and without extraneous heat for the purpose of rendering the leaves mild and less harsh.

Chicago, Illinois, October 30th, 1930.

WALTER E. LILIENFIELD.